United States Patent

[11] 3,596,521

| [72] | Inventor | Billy Lynn Guy<br>Lexington, Ky. |
| [21] | Appl. No. | 776,685 |
| [22] | Filed | Nov. 18, 1968 |
| [45] | Patented | Aug. 3, 1971 |
| [73] | Assignee | Unibraze Corporation<br>New Rochelle, N.Y. |

[54] LUBRICATING MEANS FOR PRESSURE INDICATOR
1 Claim, 4 Drawing Figs.

| [52] | U.S. Cl. | 73/419 |
| [51] | Int. Cl. | G01l 7/16 |
| [50] | Field of Search | 73/419,<br>368.3; 184/24 |

[56] References Cited
UNITED STATES PATENTS

| 2,903,888 | 9/1959 | Gföll | 73/146.8 |
| 1,836,601 | 12/1931 | Key | 73/419 X |
| 3,286,726 | 11/1966 | Guy | 73/419 X |

*Primary Examiner*—Donald O. Woodiel
*Attorney*—Robert E. Isner

ABSTRACT: A pressure indicator includes a body having movable means therein with which sealing means cooperates to determine the area of the movable means responsive to fluid introduced into the body. Lubricating means is disposed adjacent the sealing means and lubricates both the sealing means and a movable surface with which the sealing means cooperates.

PATENTED AUG 3 1971
3,596,521
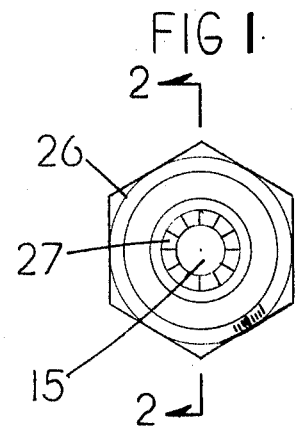
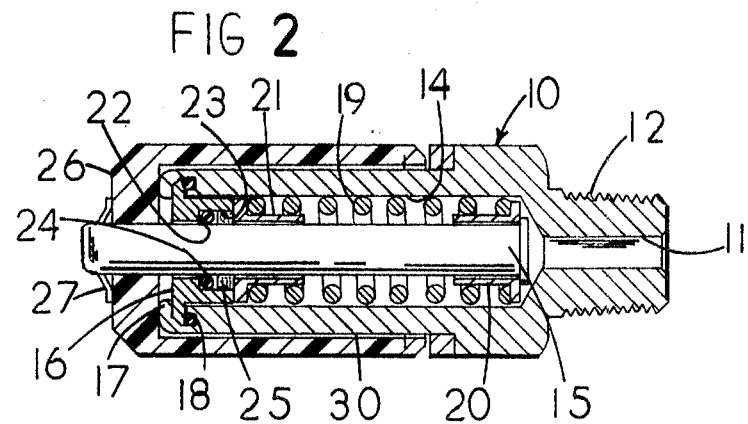
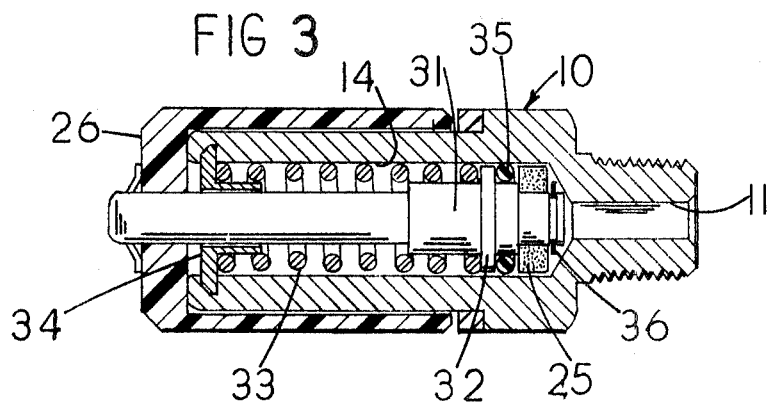
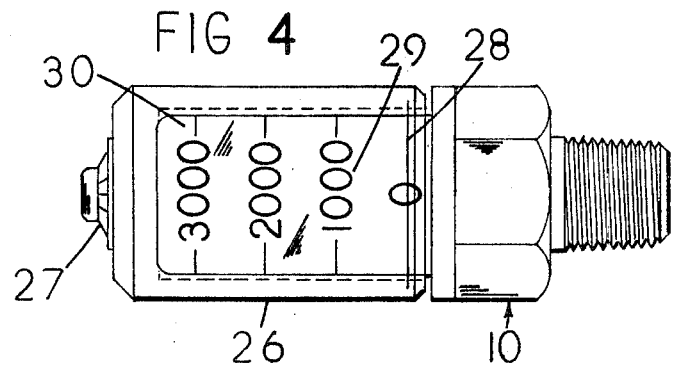
INVENTOR
BILLY LYNN GUY
Frank C. Leach Jr.
ATTORNEY

LUBRICATING MEANS FOR PRESSURE INDICATOR

In pressure indicators of the type shown and described in U.S. Pat. No. 3,286,726 issued to me, the friction between the sealing means, which is an O-ring, and the movable piston is such that movement of the piston will not necessarily occur in response to pressures at the lower end of the pressure range for which the indicator is to be used. Therefore, if the pressure of the fluid should be only at the lower end of the pressure range, the indicator of my aforesaid patent may not indicate any pressure because of the friction. Thus, before the indicator of my aforesaid patent indicates a fluid pressure, there must be sufficient pressure to overcome the friction between the material of the sealing ring and the movable piston.

Furthermore, if the indicator of my aforesaid patent is not utilized for a period of time, the material of the sealing ring tends to flow into the pores of the material of the piston so that the materials adhere to each other. Thus, when the pressure indicators of my aforesaid patent have not been utilized for a period of time, an even larger fluid pressure is required to initially move the piston. Therefore, if the pressure of the fluid should not reach the level that is required to break the adherence between the piston and the sealing ring, the pressure indicator will not indicate a pressure even when there is fluid pressure.

The present invention satisfactorily solves the foregoing problems by utilizing a lubricating means that continuously lubricates the sealing ring and the surface with which the sealing ring moves relative thereto. Thus, there is no adhering of the sealing ring to the piston because the lubricant fills the pores in the material of the piston into which the sealing ring material would enter and also keeps the material of the sealing ring lubricated. Therefore, when utilizing the lubricating means of the present invention, the pressure indicators of my aforesaid patent will move as soon as any fluid pressure is exerted on the piston. Thus, a true and accurate reading of the fluid pressure may be readily ascertained from a pressure indicator utilizing the lubricating means of the present invention.

The lubricating means of the present invention not only prevents adhering of the material of the sealing ring to the member with which the sealing ring moves relative thereto but also insures sufficient lubrication therebetween. This substantially eliminates any friction between the sealing ring and the surface which the sealing ring is movable relative thereto so that the movement of the movable member in response to the fluid pressure is not retarded by the contact between the sealing ring and the surface which the sealing ring moves relative thereto.

In my aforesaid patent, the pressure of the fluid was determined through moving a cap with the piston and having the lower edge of the cap function as the marking or indicating means. This presented the problem of the operator of the apparatus with which the pressure indicator was used not being able to view the entire scale of the pressure indicia.

The present invention satisfactorily overcomes the foregoing problem by utilizing a transparent cap whereby the operator may readily see the entire pressure range. The cap has marking means thereon for cooperation with a scale on the body of the pressure indicator.

An object of this invention is to provide a unique lubricating arrangement for a pressure indicator.

Another object of this invention is to provide a pressure indicator that always moves when subjected to a fluid pressure.

Other objects of this invention will be readily perceived from the following description, claims, and drawing.

The attached drawing illustrates preferred embodiments of the invention, in which:

FIG. 1 is an end elevational view of a pressure indicator utilizing the lubricating means of the present invention;

FIG. 2 is a longitudinal sectional view of the pressure indicator of FIG. 1 and taken along line 2-2 of FIG. 1;

FIG. 3 is a longitudinal sectional view, similar to FIG. 2, of another form of pressure indicator utilizing the lubricating means of the present invention; and FIG. 4 is a side elevational view of the pressure indicator of FIGS. 1 and 2.

Referring to the drawing and particularly FIGS. 1 and 2, there is shown a body 10 of a pressure indicator having a passage 11 through which fluid may be introduced into the interior of the body 10. The body 10 has threads 12 on one end thereof to connect the body 10 to a member having a passage for communicating with the passage 11.

The body 10 has a cylindrical chamber 14 formed therein and communicating with the passage 11. A piston 15 is disposed within the chamber 14 and has one end disposed adjacent the passage 11 in the body 10 and its other end extending outwardly through a passage in a cap 16, which is secured to the body 10. The cap 16 is fixed to the body 10 by rolling portion 17 of the body 10 downwardly. A gasket 18 is disposed between the cap 16 and the body 10 to form a fluid seal therebetween.

The piston 15 is continuously urged toward the passage 11 by a spring 19. The spring 19 has one end acting on a retainer 20, which is fixed to the piston 15. The other end of the spring 19 engages a retainer 21, which abuts against an end of the cap 16.

The cap 16 has a shoulder 22 defining one end of a recess 23 within which an O-ring 24 is disposed. The inner surface of the O-ring 24, which has one side in contact with the shoulder 22 of the cap 16, bears against the outer surface of the piston 15 to form a seal therebetween. Likewise, the outer surface of the O-ring 24 bears against the wall of the recess 23 to form a seal therewith. Accordingly, the O-ring 24 has one surface in engagement with a fixed surface, which is the wall of the recess 23, and its other surface in engagement with a movable surface, which is the surface of the piston 15.

The lubricating means comprises a bushing 25, which is disposed adjacent one side of the O-ring 24 and in contact with the surface of the piston 15 against which the inner surface of the O-ring 24 bears. Thus, the lubricating bushing 25 is capable of lubricating both the O-ring 24 and the piston 15.

One suitable example of the bushing 25 is a sintered bronze ring, which is impregnated with a nonhydrocarbon lubricating medium such as liquid Teflon or Fluorolube, for example. Fluorolube is a trademark of Hooker Chemical Company for a nonhydrocarbon lubricating medium. The nonhydrocarbon lubricating medium is introduced into the sintered ring, which is porous, after air has been removed from the ring by producing a vacuum.

The end of the piston 15 extending beyond the body 10 has a transparent cap 26, which is preferably formed of a clear plastic, attached thereto for movement therewith. The cap 26 is secured to the piston 15 by suitable means such as retaining element 27, for example. Thus, any axial movement of the piston 15 results in axial movement of the cap 26 relative to the body 10.

As shown in FIG. 4, the cap 26 has an indicating mark 28 thereon for cooperation with a scale 29 on a portion 30 of the body 10. As shown in FIG. 4, the calibrations of the scale 29 extend from 0 to 3,000. Thus, a relatively large pressure range is measurable by the pressure indicator of FIGS. 1, 2, and 4.

Considering the operation of the pressure indicator of FIGS. 1, 2, and 4, fluid pressure enters the body 10 through the passage 11 and acts on the end of the piston 15 within the chamber 14. Because the O-ring 24 is disposed around the smallest diameter of the piston 15, the area of the piston 15 subjected to the pressure is relatively small in comparison with the diameter of the chamber 14. However, with relatively high pressures being measured, the area of the piston 15 need not be very large.

As the piston 15 moves to the left in FIG. 2, the cap 26 moves therewith. Thus, the mark 28 on the cap 26 moves therewith to indicate the pressure of the fluid entering the body 10 through the passage 11 by cooperation with the scale 29.

The lubricating bushing 25 supplies the lubricating medium to both the surface of the piston 15 and to the O-ring 24. Thus, there is always a source of lubricant available to insure a substantially friction-free relation between the O-ring 24 and the piston 15.

The movement of the piston 15 in response to the pressure of the fluid entering the passage 11 is limited by the end of the retainer 20 engaging the end of the retainer 21. This provides a positive mechanical stop.

Referring to FIG. 3, there is shown a pressure indicator utilized to measure relatively low pressures. The indicator includes the body 10, which is the same as the body 10 of the embodiment of FIG. 2. However, a piston 31, which is different in shape from the piston 15, is disposed within the chamber 14 of the body 10. The piston 31 has a flange 32 integral therewith and adjacent its end exposed to the fluid entering the body 10 through the passage 11.

A spring 33 has one end acting against the flange 32 and its other end acting against a cap 34, which is different from the cap 16. The spring 33 continuously urges the piston 31 to the right against the pressure of the fluid entering the chamber 14 through the passage 11.

The cap 34 is secured to the body 10 in the same manner as is the cap 16. There is no sealing gasket between the cap 34 and the body 10 since none is required as will be apparent.

The piston 31 has an O-ring 35 mounted thereon adjacent the flange 32 for movement therewith. Thus, the inner surface of the O-ring 35 bars against the piston 31 but does not move axially relative thereto while the outer surface of the O-ring 35 moves axially relative to the wall of the chamber 14. Accordingly, the sealing ring 35 has relative axial movement with respect to the wall of the chamber 14 rather than with respect to the piston 31. This is because it is desired to have the area of the chamber 14 as the effective area of the piston 31 acted on by the fluid entering through the passage 11 since this embodiment is utilized for fluids having relatively low pressure.

The piston 31 has the lubricating bushing 25 supported thereon on the same portion of the piston 31 as the O-ring 35 and adjacent the O-ring 35. Thus, the bushing 25 supplies lubricant to both the O-ring 35 and the wall of the chamber 14 with which the O-ring moves relative thereto. This arrangement insures that there is no adhering of the O-ring 35 to the wall of the chamber 14 during any period of inactivity of the pressure indicator and that there will always be lubricant available between the O-ring 35 and the wall of the chamber 14 whereby a substantially friction-free movement of the piston 31 may occur.

The O-ring 35 and the lubricating bushing 25 are retained on the piston 31 by a retaining element 36. The retaining element 36 is disposed within a groove in the piston 31 so as to prevent any movement of the O-ring 35 and the bushing 25 relative to the piston 31.

Considering the operation of the device of FIG. 3, the pressure of fluid entering the chamber 14 by the passage 11 moves the piston 31 to the left. This fluid pressure acts on an effective area of the piston 31 that is equal to the area of the chamber 14 since the O-ring 35, which moves axially with the piston 31, engages with the wall of the chamber 14. Thus, a relatively large area is presented so that the piston 31 moves in response to small pressures.

As the piston 31 moves to the left in FIG. 3, the transparent cap 26, which is secured to the piston 31 in the same manner as it is secured to the piston 15, moves relative to the body 10. As a result, the indicating mark 28 on the cap 26 indicates the pressure of the fluid entering the chamber 14 in the body 10 through the passage 11 by cooperation with the scale, which will be calibrated in smaller increments and a smaller range than the scale 29.

While the cap 26 has been described as being transparent, it should be understood that the cap 26 does not have to be transparent. While the lubricating means of the present invention has been shown as being utilized with pressure indicators similar to those of my aforesaid patent, it should be understood that the lubricating means may be utilized with any type of pressure indicator.

While the bushing 25 has been described as having a nonhydrocarbon lubricating medium, it should be understood that any suitable lubricating medium may be employed. The lubricating medium must be compatible with the fluid having its pressure measured by the pressure indicator.

An advantage of this invention is that the indicator is always responsive to pressures, even relatively low pressures, and indicates such. Another advantage of this invention is that the sealing ring remains lubricated. A further advantage of this invention is that a lubrication source is always available for the sealing ring and the surface that the sealing ring moves relative thereto.

For purposes of exemplification, particular embodiments of the invention have been shown and described according to the best present understanding thereof. However, it will be apparent that changes and modifications in the arrangement and construction of the parts thereof may be resorted to without departing from the spirit and scope of the invention.

I claim:
1. A pressure indicator including a body;
   said body having aperture means to introduce a fluid into said body;
   means disposed within said body and movable relative to said body in response to pressure of fluid introduced into said body;
   compressed spring means normally biasing said movable means at a limiting position adjacent said fluid entry aperture means and urging said movable means in the opposite direction to the pressure exerted on said movable means by the fluid;
   compressibly deformable sealing means disposed intermediate said movable means and an interiorly disposed and nonmoving surface of said body and in continuous compressive interfacially engaged relation therewith independent of the position of said movable means relative to said body to prevent fluid flow therebetween;
   porous metallic lubricating means disposed immediately adjacent said sealing means to lubricate the compressible interfacially engaged surface of said sealing means disposed at the junction of said movable means and the said inner and nonmoving surface of said body and to minimize the static friction therebetween at said junction location;
   pressure magnitude representing indicia means on the exterior surface of said body to indicate the magnitude of the pressure of the fluid introduced in said body in accordance with the amount of movement of said movable means relative to said body;
   and a transparent cap having marking means thereon fixed to said movable means for movement therewith whereby said marking means and pressure magnitude representing indicia means cooperate to visually indicate the pressure of the fluid.